United States Patent [19]

Miwa

[11] Patent Number: 4,951,994
[45] Date of Patent: Aug. 28, 1990

[54] SUSPENDED TYPE AIR-DAM SKIRT

[76] Inventor: Tsutomu Miwa, 3010-8, Sayamagaoka 1-chome, Tokorozawa-shi; Saitama 359, Japan

[21] Appl. No.: 237,732
[22] PCT Filed: Oct. 26, 1987
[86] PCT No.: PCT/JP87/00820
  § 371 Date: Jun. 27, 1988
  § 102(e) Date: Jun. 27, 1988
[87] PCT Pub. No.: WO88/03104
  PCT Pub. Date: May 5, 1988

[30] Foreign Application Priority Data
  Oct. 27, 1986 [JP] Japan .................. 61-253761

[51] Int. Cl.⁵ .............................. B62D 37/02
[52] U.S. Cl. ................... 296/180.1; 296/180.5; 293/118; 293/123; 180/903
[58] Field of Search ........... 296/180.1, 180.5, 180.3; 293/103, 118, 123, 138; 180/903

[56] References Cited
U.S. PATENT DOCUMENTS 4,379,582  4/1983  Miwa ................... 296/180.5
4,758,037  7/1988  Suzuki et al. ......... 296/180.1

FOREIGN PATENT DOCUMENTS 165094   12/1985  European Pat. Off. ....... 296/180.1
2159636   6/1973  Fed. Rep. of Germany ... 296/180.1
2912612  10/1980  Fed. Rep. of Germany ... 296/180.1
2935635   3/1981  Fed. Rep. of Germany ... 296/180.5
50-98019   8/1975  Japan .
55-027751  2/1980  Japan .
56-129373 10/1981  Japan .
58-85764   5/1983  Japan ................... 296/180.5
59-156875  1/1984  Japan .

Primary Examiner—Margaret A. Focarino
Assistant Examiner—Andrew C. Pike
Attorney, Agent, or Firm—Lowe, Price, LeBlanc, Becker & Shur

[57] ABSTRACT

An air-dam skirt is suspended from a car body (4) in a floating state by resilient members (3), and guide members (5) and regulating members (6) projecting vertically from the car body (4) or the air-dam skirt (1) into mutual sliding meshing contact with one another to move vertically in a predetermined orbit. Inverse lifting plates (15) or bottom inverse lifting plates (16) reliably lower the air-dam skirt (1) in front of the front wheels when it is necessary to prevent lifting. The base of each guide member (5) or regulating member (6) is fitted movably and is fixed by a shock absorbing member (17) so as to protect the air-dam skirt (1) against breakage.

12 Claims, 5 Drawing Sheets

SUSPENDED TYPE AIR-DAM SKIRT

TECHNICAL FIELD

This invention relates to an air-dam skirt for an automobile which is vertically moveable to provide good aerodynamic effect while being resistant to breakage and, more particularly, to an air-dam skirt for reducing air resistance and lift of the automobile while being resistant to breakage.

BACKGROUND OF THE INVENTION

Vertically movable air-dam skirts mounted to car bodies by means of stems are mass-produced and sold at present by Alpha Lancia Company for air-flow actuated types and by Nissan Motor Company for motor-protruded types.

Moreover, air-dam skirts of which I am aware are all mounted by stems without any exception, including other several examples exhibited in the Motor Show. These air-dam skirts can be extended downward to a larger size to have higher aerodynamic effects during high-speed runs and retracted to avoid breakage by obstacles on the road surface during low-speed runs.

The air-dam skirt contacts, when lowered, an upper outer plate of the car body so that the air resistance is reduced by preventing the on-coming air from flowing into the inside of the car body.

Therefore, the stem-mounting type capable of lowering the air-dam skirt accurately to a predetermined position with minimum frictional resistance is applied without any exception to the vertically movable type air-dam skirt.

To simplify the structure and minimize production cost, it is desirable to reduce the number of stems and mounted portions. This reduction of mounted portions is exemplified by the mass-produced cars of the front opening type and the protruding type. In the front opening type, the stems are disposed at the back of the air-dam so that the front may be opened. In the protruding type, on the other hand, the stems are disposed in the vicinity of the front nose of the car body so that the air-dam may be protruded from the back. Thus, the mounted portions are located only at the back or front of the air-dam.

When the mounted portions are disposed forwardly of the front wheels, the air-dam is liable to have its rear lower ends come close to the road surface, even if it is raised, and possibly broken when the car is to be parked. This breakage is prevented in the front opening type by positioning the rear portion of the air-dam at a higher level than the front portion when the air-dam is lowered.

Since, in the protruding type, the mounted portions are located in the vicinity of the leading end of the car body, there is no space in the car body for accommodating the raised air-dam in cases where the air-dam extends as far as the sides of the car body. This limits the location of the air-dam to the front of the car body while omitting the air-dam in the space at the body sides from the rear ends of the air-dam to the front wheels so that the air flow undesirably enters through that space onto the bottom of the car body to reduce the lift preventing effect.

The air-dam skirt is intrinsically provided for preventing lift of the car body. Prevention of lift is of greater importance during a turn of the car with a side wind, in which a stronger inertia and lift is exerted upon the car body, than during a straight run.

In case, however, a space is left just forwardly of the front wheels and is not covered with the air-dam, the air flowing obliquely from the front onto the bottom of the car body during the turn of the car with the side wind cannot be blocked to prevent lift of the car body at the most critical time.

In order to minimize the air resistance, on the other hand, it is desirable to cover the fronts of the front wheels up to the positions as low as possible.

Especially in order to minimize the air resistance during the straight run, it is effective for the car body having a tapered front nose that the air-dam skirt extends to low positions up to the fronts of the wheels to cover the front wheels.

It is necessary, for practical purposes, that the air-dam skirt should not be easily broken while the car is running at a low-speed or when parking. The intrinsic object of dropping the air-dam skirt during a high-speed run is to retract it during a low-speed run to thereby prevent its breakage.

In the vertically movable air-dam skirts of the above-specified two types now known, breakage prevention and cost minimization are stressed while leaving the minimization effects of the lift and the air resistance seriously insufficient.

This invention has an object to provide an air-dam having the best aerodynamic and breakage preventing effects at the lowest cost.

DISCLOSURE OF THE INVENTION

According to this invention, the air-dam skirt is suspended in a floating state from a car body by means of springs or cylinder members, and stem-mounted portions are not provided as the members for positioning the car body and the air-dam skirt.

The role of the existing stems for accurate movements to predetermined positions is played by the combination of two members: vertically extending rod-shaped members; and other members adapted to be brought into contact with the rod-shaped members for effecting the positioning together with each other.

Therefore, the mechanism for moving the air-dam skirt accurately along a path to a predetermined position and the mechanism for suspending the air-dam skirt in a vertically movable state from the car body are theoretically different in principle, and the positioning members bear only the positioning operations.

Moreover, the aforementioned positioning members are mounted by means of shock absorbing members so that the air-dam skirt may be prevented from any breakage when it is not only extended downward but also retracted.

This Figure is added to illustrate what portion of the car body the difference in the major aerodynamic effects between the vertically movable air-dam skirts of this invention and the prior art during the turn with the side wind is established from.

BEST MODE FOR CARRYING OUT THE INVENTION

The structure of the present invention will be described in connection with the embodiments thereof with reference to the accompanying drawings.

Figure 1:
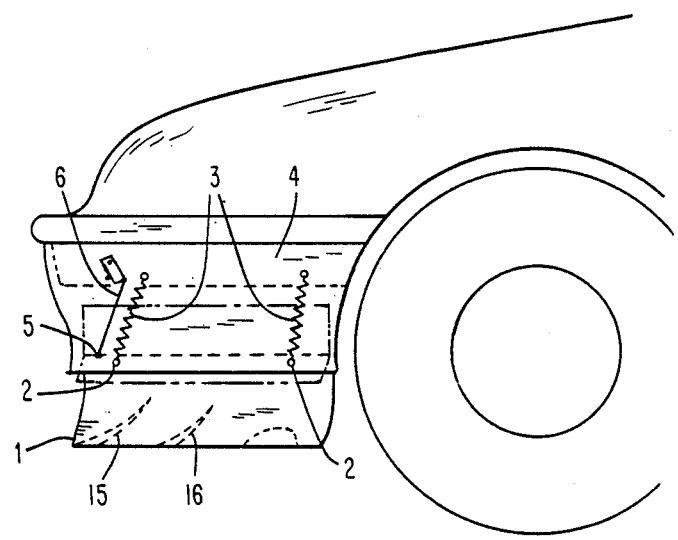
FIG. 1 is a side elevational view of the air dam skirt of the present invention.

The fundamental feature of this invention resides in that an air-dam skirt (1) is suspended in a floating state from a car body (4) by means of a plurality of righting members such as springs (3) having lower ends secured to the skirt via mounting projections (2), as shown in FIG. 1.

In the stem-mounting type of the prior art, the moving path of the air-dam can be regulated. In the floating suspension of this invention, another mechanism is required for positioning the suspended air-dam skirt (1) with respect to the car body.

In order to minimize the air resistance, a gap between the air-dam skirt (1) and an upper cover plate has to be restricted so that the air flow may not pass therethrough onto the bottom of the car body. Particularly, the front of the car body receiving high wind pressure has to be constructed so as to have no unnecessary gap.

Figure 3:
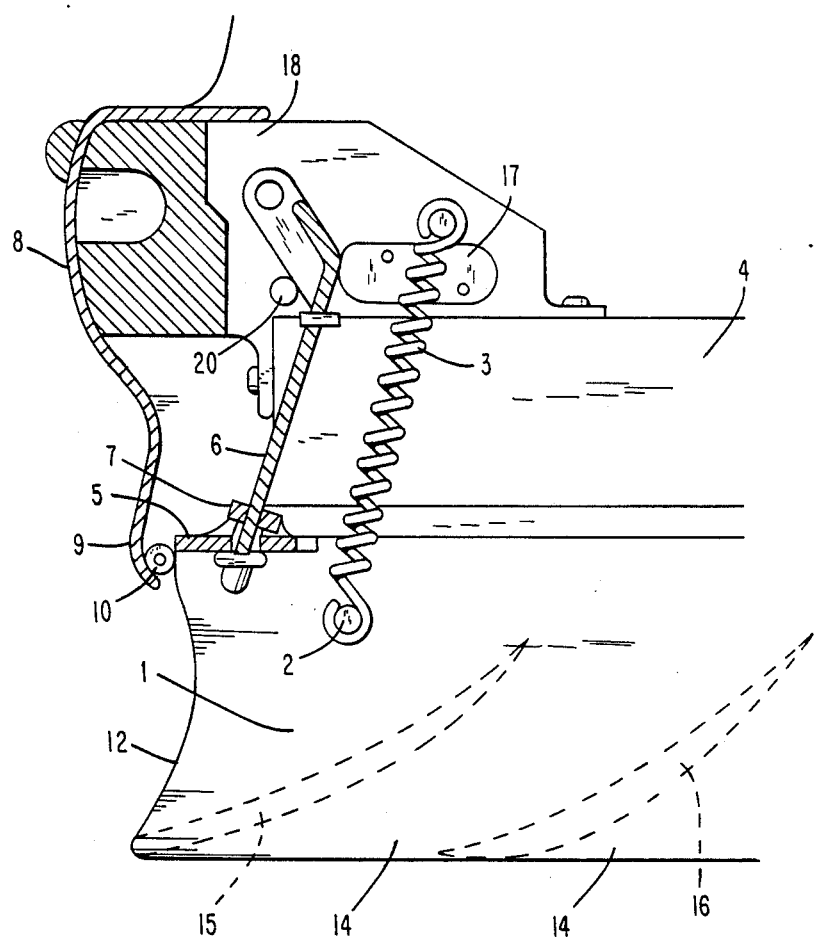
FIG. 3 is an enlarged sectional side elevational view of the present invention.

In the present invention, therefore, regulating members (6) and guide members (5) are disposed in the front of the car body such that the former are loosely fitted in the latter, as shown in FIG. 3, and have their relative positions regulated.

As a result, the air-dam skirt (1) can be accurately suspended in the vicinity of the body cover plate such as a bumper (8) or an apron (9) with an accurate path.

The small gap between the air-dam skirt (1) and the overlying cover plate of the car body (4) is completely sealed by trimming the lower end of the body cover plate with a packing member (10) such as a rubber tube, as shown in FIG. 3 or trimming the upper end of the air-dam skirt with the packing member. Generally speaking, those mass-produced parts are not easy to manufacture to within a tolerance of millimeters. With the packing member (10), however the car body (4) and the air-dam skirt (1) can be held in sealed contact by their parts, even if more or less inaccurately sized, to prevent the on-coming air from flowing into the car body (4) which would increase air resistance.

For smooth sliding contact between the guide member (5) and the regulating member (6), as shown in FIG. 3, there is disposed a bearing (7) for miniminizing friction and noise. This bearing (7) provides for smoother movement in the vertical direction of the air-dam skirt of this invention than those of stem-mounting type air-dam skirt of the prior art.

Figure 2:
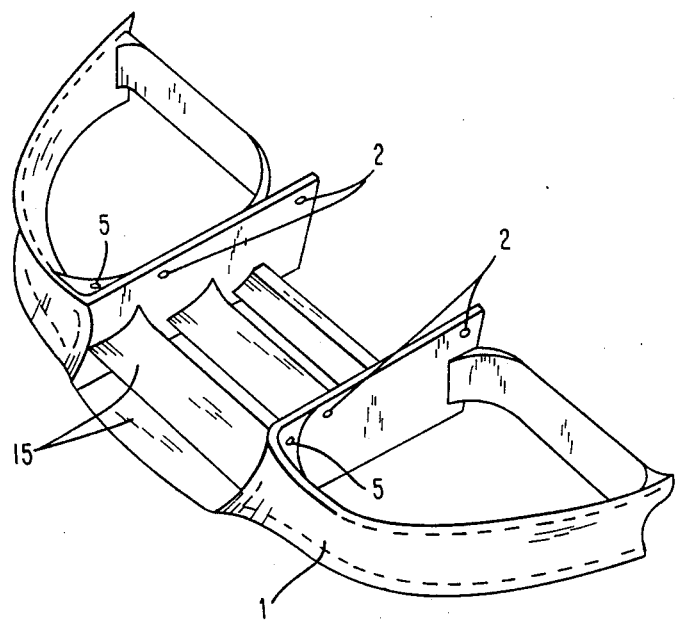
FIG. 2 is a perspective view of the present invention.
Figure 4:
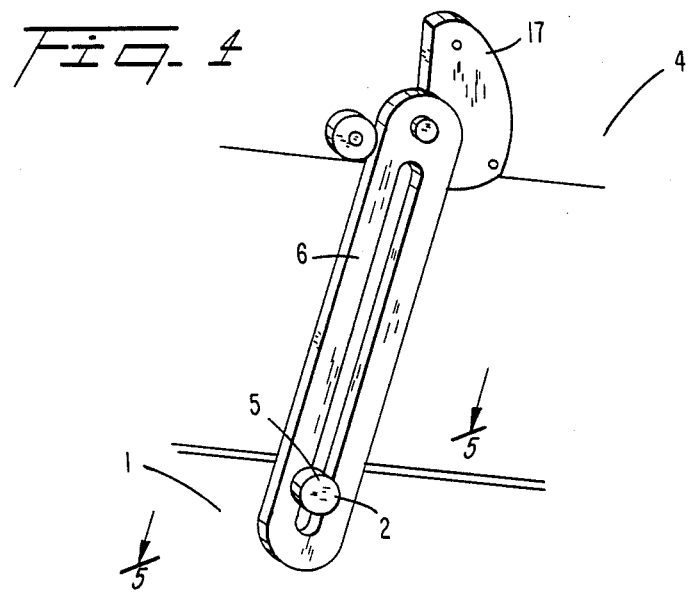
FIG. 4 is a perspective view of another embodiment of the positioning members.
Figure 5:
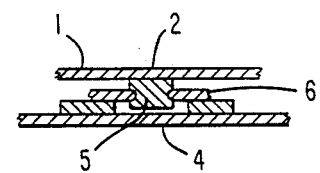
FIG. 5 is a sectional view taken along lines 5—5 of FIG. 4.
Figure 6:
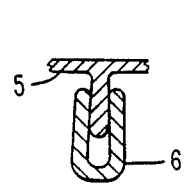
FIG. 6 is a sectional view similar to that shown in FIG. 5 of another embodiment of the positioning members.

With reference to FIGS. 4, 5, and 6, FIG. 4 is a perspective view showing the guide member (5) and the regulating member (6), and FIG. 5 is a section taken along line 5—5 of FIG. 4 and shows an embodiment other than that of FIGS. 1 to 3.

In FIG. 4, the regulating member (6) extends downward from the car body and is slotted at its center so that it may be guided by the bulging head of the guide member (5). Thus, the regulating member (6) is prevented from coming out through its slot by the guide member (5). As seen from the section of FIG. 5, moreover, the guide member (5) is mounted on the air-dam skirt (1) in position relative to the car body.

The relation between the guide member (5) and the regulating member (6) may be effected by means of a loose fit or brace if they are in sliding engagement with each other.

FIG. 6 shows an embodiment other than that of FIG. 5, in which the guide member (5) is braced by the regulating member (6). If the regulating members (6) are mounted on the righthand and lefthand sides of the car body (4), the guide member (5) can define the vertical path of the air-dam skirt (1) while being prevented from coming out like the embodiment of FIGS. 3, 4, and 5. For these accurate and smooth vertical movements, either the regulating member (6) or the guide member (5) has to extend vertically straight with a length sufficient for covering the whole stroke from upper to lower limits. In this invention, the members mounted on the car body are called the regulating members (6) whereas the members mounted on the air-dam skirt (1) are called the guide members (5) for convenience purposes only, but their shapes should not be specified.

Although not shown in the drawings, guide members (5) may protrude upward in a rod shape from the air-dam skirt (1) and are held in sliding engagement with the regulating members (6) fixed on the car body.

When the bearings (7) are disposed at the portions where the guide members (5) and the regulating members (6) are in sliding engagement with each other, they allow the air-dam skirt (1) to be vertically moved remarkably smoothly and accordingly to be moved downward without any drag other than drag induced by the on-coming wind pressure, even if no motor is used. The wind pressure will be far stronger than the frictional force.

Figure 7:
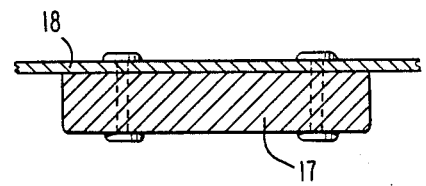
FIG. 7 is a sectional view of a portion of one embodiment of shock absorbing members to be used for fixing the positioning members.

Shock absorbing members (17) to be used when the regulating members (6) are mounted on the car body (4) will be described with reference to the sectional top plan view of FIG. 7. Each of these shock absorbing members (17) is made of rubber or the like and is mounted on a bumper stay (18) by means of a fitting.

With reference to FIG. 3, the shock absorbing member (17) is associated with a projection (20) to limit forward movement of the regulating member (6) which is mounted on the bumper stay (18). As a result, the shock absorbing member (17) will contract, when the air-dam skirt (1) comes into contact with an obstacle on the road, before the air-dam skirt (1) is broken, so that the regulating member (6) is allowed to move counter-clockwise thereby to protect the air-dam skirt (1) from any breakage.

Figure 8:
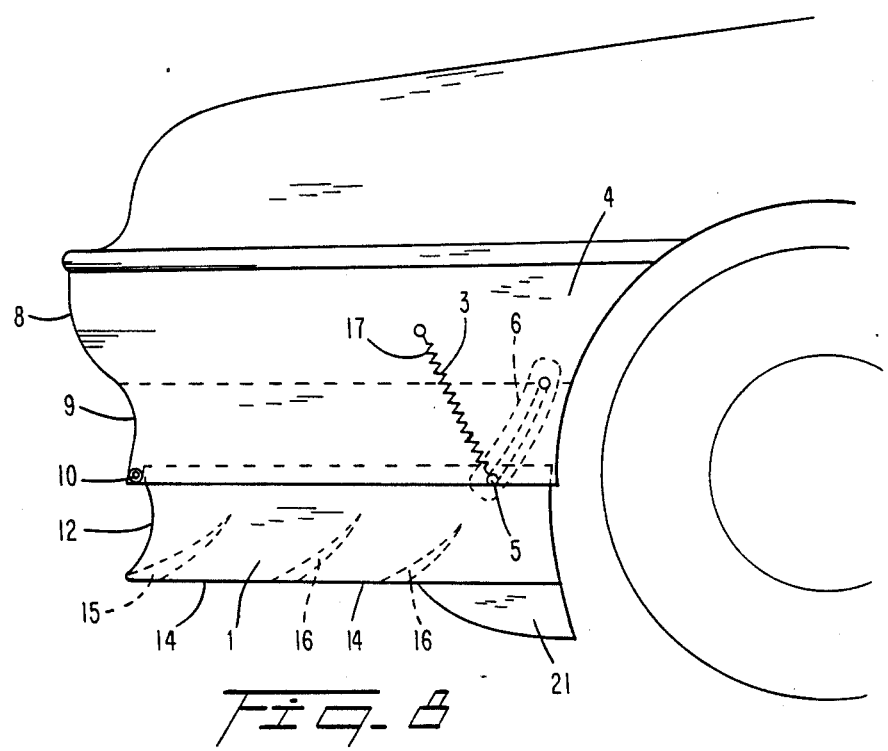
FIG. 8 is a side elevational view of another embodiment in which the positioning members are mounted on the back of the air-dam skirt and in which the shock absorbing members are springs.

In an embodiment to be described with reference to FIG. 8, the regulating members (6) are mounted on the car body (4) at the rear upper portions of the air-dam skirt (1). FIG. 8 presents a side view showing the rear portions of the air-dam skirt (1) mounted on the car body (4) by means of stems. In this embodiment, springs (not shown) are also disposed in the front portions of the air-dam skirt (1). This embodiment is similar to the remaining embodiments in that the air-dam skirt (1) is suspended in the floating state by means of the several springs.

In FIG. 8, the guide members (5) disposed in the rear portions of the air-dam skirt (1) are braced by the regulating members (6) mounted on the car body (4) which project downward and guide the movements of the air-dam skirt (1).

FIG. 8 shows not only an inverse lifting plate (15) disposed in a front inlet (12) in front of the car body but also bottom inverse lifting plates (16) disposed in bottom air inlets (14) formed at the back of the former.

As a result, the inverse lifting plates can be afforded larger areas to force the air-dam skirt (1) as a whole in a well balanced state by the on-coming wind pressure. The on-coming air flows having passed along the upper and lower sides of the upstream inverse lifting plate (15) are guided along the bottom inverse lifting plates (16) disposed downstream so that the car body is forced toward the road surface to have its run stabilized by the strong inverse lifts which are established by the differences in the air pressure between the upper and lower sides of the many inverse lifting plates.

To augment the flow rates of the air flowing into the bottom inverse lifting plates (16) disposed downstream, it is effective to position the air-dam skirt (1) with its bottom being sloped down backward. However, if the rear portion of the air-dam skirt (1) is lower than the front portion, it is liable to be broken. As shown in FIG. 8, therefore, the air-dam skirt (1) is suspended from the car body through the regulating members (6) by the springs (3) extending slightly downhill from the front. Thus, the air-dam skirt (1) is protected against breakage by the actions of the springs (3), the counter-clockwise motions of the regulating members (6) and the movements of the guide members (5).

In order to protect the air-dam skirt (1) against breakage, either the vertically extending regulating members (6) or the guide members (5) are desirably so mounted at their roots by righting members strong enough for withstanding the wind pressure such that their leading ends are allowed to move back and forth and to the right and left. FIGS. 3 to 8 present only several ones of the embodiments of the various fixing structures.

Figure 9:
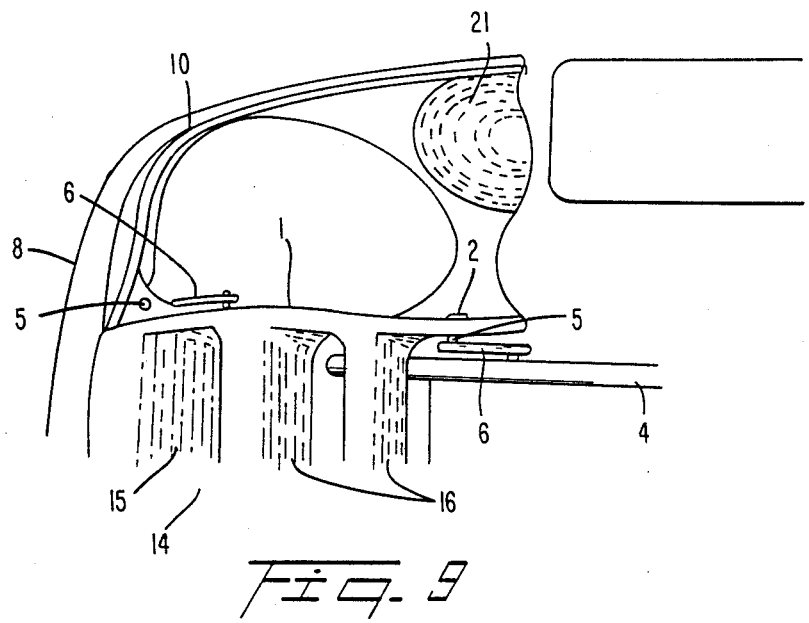
FIG. 9 is a bottom view of the embodiment shown in FIG. 8 and wherein the positioning members are also mounted on the front portion of the air-dam skirt.

FIG. 9 is a bottom view of FIG. 8, in which the regulating members (6) are shown in the front portions of the air-dam skirt as well.

As shown in FIGS. 8 and 9, aerodynamic tire covers (21) are disposed just in front of the front wheels and below the air-dam skirt (1) to cover the front wheels and reduce the air resistance.

The air-dam skirt reduces wind pressure acting upon the front wheels to decrease air resistance as a function of extent to which the air-dam skirt is lowered. For this purpose, the bottom of the air-dam skirt (1) has to be shaped so that the air flows may not separate at the sides of the car body, as shown in FIG. 9.

Figure 10:
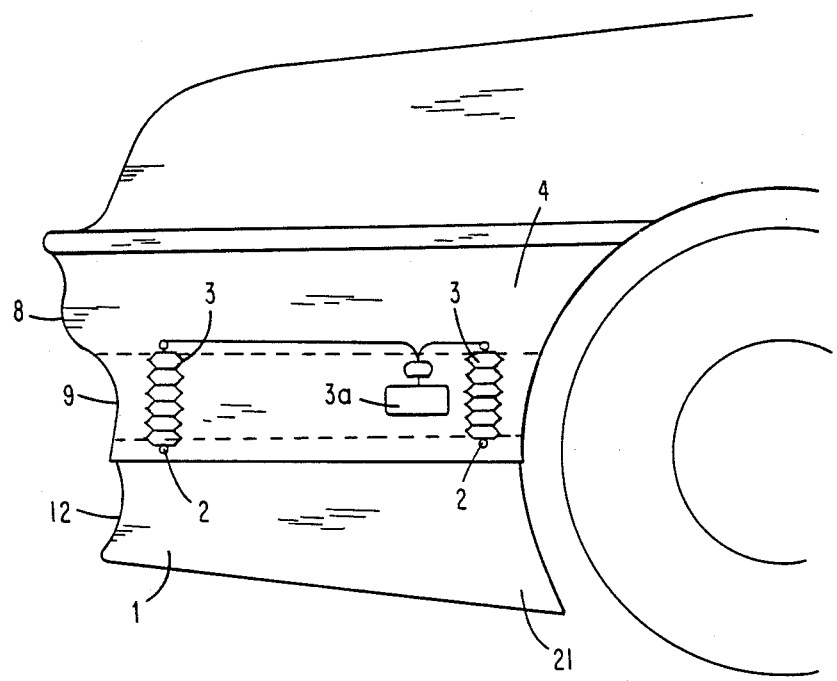
FIG. 10 is a side elevational view of another embodiment, in which the air-dam skirt is vertically moved by power and in which the air-dam skirt is mounted on the car body by means of cylinder members with the positioning members being omitted.

With reference to FIG. 10, the air-dam skirt (1) is suspended in a floating state from the car body by means of air suspensions of rubber bellows or metal cylinders, which act as the righting members (3). In the case of the metal cylinders, the righting members (3) can play the role of the regulating members (6). The metal cylinders can freely move the air-dam skirt up and down by changing the amount of the gas or liquid to be confined therein.

In the embodiment of FIG. 10, the vertical movements of the air-dam skirt (1) are mechanically accomplished by increasing or decreasing the liquid or gas with an actuatable pump (3a) to regulate the oncoming wind pressure through the inverse lifting plate (15).

The modes of this invention have a variety of combinations of the embodiments thus far described. In any combination, the modes of embodiments are characterized in that the air-dam skirt suspended in the floating state can be moved up and down, if necessary, by holding the regulating members, the guide members, and the righting members (3) in place in sliding engagement and by securing their mounted portions with the shock absorbing members (17).

The effects obtainable in case this invention is practiced in its best mode will be described in the following with reference to the accompanying drawings.

Figure 11:
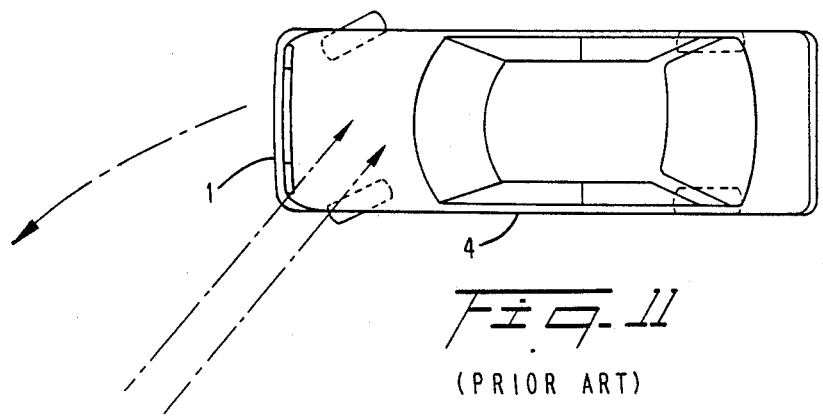
FIG. 11 is a top plan view of an automobile and air flows to show that the automobile equipped with the vertically movable type air-dam skirt of the prior art has a portion for admitting air flow from the front portions of the front wheels onto the bottom of the car body during a turn with a side wind so that the aerodynamic effects are unsatisfactory.

FIG. 11 is a top plan view showing a car which is equipped with the existing air-dam skirt of a vertically moving type. As indicated by dotted arrows, the air flows into the bottom of the car, bypassing the air-dam skirt, when the car is turning and receiving the side wind.

On the contrary, the car equipped with the air-dam skirt of the present invention has its air-dam skirt extending in the lower position just to the fronts of the front wheels, as shown in FIGS. 1 to 3 and 8 to 10 to protect the air inflow to the bottom of the car body. When the car is turning into or driving with a side wind, i.e. when it is most unstable and requires a reduction in lift, the ratio of air flowing to the bottom of the car body equipped with the air-dam skirt of the present invention is far less than that of the existing car so that a higher safety run can be achieved.

Moreover, the air resistance during a straight run is less than that of the existing car.

In this decade when the technique of dropping the air resistance to the car body has developed, the air resistance caused by tires raises a serious problem since they have a tendency to become wider. The effects of the aerodynamic tire cover shown in FIGS. 8 and 9 are experimentally clarified by Ford Motor Company. As shown in FIG. 10, the air-dam skirt lowered up to the road surface covers the fronts of the front wheels like the aforementioned aerodynamic tire covers to highly drop the air resistance.

On the other hand, the leading end of the latest car body having a small air resistance has to be tapered, including the air-dam disposed below. In the case of the tapered front nose, the effect of the present invention should be appreciated, in which the air-dam can be dropped just to the fronts of the front wheels.

In the case of the vertically moving type existing air-dam skirts of the front opening or protruding type, the air-dam is not dropped just to the fronts of the front wheels. They are therefore far inferior to the air-dam skirt in the effects of preventing the lift during a turn with a side wind and reducing the air resistance during a straight run.

As shown in FIGS. 3 and 8, the bottom inverse lifting plates (16) mounted on the air-dam skirt are inverse lifting means which are not present in the existing mass-produced cars.

These bottom inverse lifting plates (16) can be mounted effectively and practically for the first time, if the low air-dam skirt is disposed just in the fronts of the front wheels and close to the road surface. In the case of the mass-produced cars, generally speaking, the low air-dam cannot be practiced because they have to be kept away from collisions with obstacles on the road. According to the present invention, however, the low air-dam can be first practiced by the vertically moving air-dam of floating and shock absorbing type according to this invention.

The inverse lift of those bottom inverse lifting plates (16) can be further strengthened by directing the bottom of the air-dam slightly forward to augment the flow rate of inlet air.

Thus, the air-dam skirt of this invention is far superior to those of the existing car in the effects of preventing the lift and reducing the air resistance during the straight run, during the turn, and during the run with the side wind.

The air-dam skirt of this invention is suspended in the floating state and has its positioning members movably mounted at their roots and mounted by the righting members to absorb the shocks.

As shown in FIG. 3, the roots of the regulating members (6) are mounted by the shock absorbing members (17) of righting rubber so that the force, which might otherwise break the air-dam, is released through the composed force through two kinds of upward and backward movements of the air-dam.

Moreover, the vertically extending members, i.e., the regulating members or the guide members are preferably replaceable and effective for absorbing the shocks if they are made of such a weak material as will be broken by a slightly weaker force than that breaking the air-dam. This is intended to protect the larger air-dam from any breakage by breaking the cheaper and smaller members to release the shocks.

The air-dam skirt of this invention can be manufactured at a lower cost with higher effects than the existing skirt of protruding type, which is motor driven and controlled with a velocity sensor.

Seven patents directed to the vertically moving air-dam skirt have been issued till now, as far as I know, including U.S. Pat. Nos. 3,618,998 and 3,776,587, Japanese Patent Laid-Open No. 50-98019, U.S. Pat. Nos. 4,131,308 and 4,159,140, Japanese Utility Model Publication No. 55-027751, and U.S. Pat. No. 4,379,582.

Formerly since 1970, the well-known automobile makers, Ford and Toyota, have respectively filed two and one patent applications directed to the air-dam skirt. The air-dam skirts thus far disclosed including them are all mounted by means of stems, but none of them is suspended in the floating state as in this invention.

The fundamental structure of this invention resides in that the suspending and positioning techniques are basically separated in concept. Despite this remarkably simple structure, however, the suspending and positioning techniques can be exemplified at a reasonable cost by complicated combinations with high effects.

INDUSTRIAL APPLICABILITY

As has been described hereinbefore, the suspended type air-dam skirt according to this invention is superior to the existing one in the fuel economy due to reduction of the air resistance and in the body stability and running safety due to an increase in the inverse lift during a turn with a side wind. Moreover, the practical effect of releasing the shocks coming from collisions against obstacles on the road surface to protect the car body from breakage can be realized at a reasonable cost. Thus, the air-dam skirt of this invention can be applied to the ordinary mass-produced cars.

This invention is effective for reducing the air resistance to the tires, too, which will raise the most serious obstruction against the improvement in the air resistance to the existing car having its air resistance for other causes reduced.

Still moreover, the members required are at acceptable costs in view of their effects so that the air-dam skirt of this invention can enjoy a high industrial applicability.

What is claimed is:

1. A suspended type air-dam skirt for a body of a car, comprising: means for resiliently suspending said air-dam skirt from the car body; guide members mounted on one of said air-dam skirt and said car body; and regulating members mounted on the other of said air-dam skirt and said body, one of said guide members and said regulating members being adapted to vertically extend to thereby regulate a moving path of said air-dam skirt by mutual sliding engagement between said guide members and said regulating members.

2. A suspended type air-dam skirt according to claim 1, wherein said resilient means includes springs suspending said air-dam skirt at front and rear portions thereof, and at righthand and lefthand portions thereof, wherein said guide members have holes formed in the front portions of said air-dam skirt suspended from said car body by said springs, and wherein said regulating members include rods projecting loosely into said holes.

3. A suspended type air-dam skirt according to claim 1, wherein said regulating members project downward from said car body, and wherein said guide members are mounted on said air-dam skirt to brace said regulating members.

4. A suspended type air-dam skirt according to claim 1, further comprising bearings disposed in portions in which said guide members and said regulating members are in sliding engagement.

5. A suspended type air-dam skirt according to claim 1, wherein said guide members project upward from said air-dam skirt, and wherein said regulating members are mounted on said car body for loosely fitting, with and supporting said guide members.

6. A suspended type air-dam skirt according to claim 1, further comprising a resilient packing member fitted on one of a lower end of an outer plate of said car body above said air-dam skirt and an upper end of said air-dam skirt.

7. A suspended type air-dam skirt according to claim 1, further comprising: a front inlet formed in a front portion of said air-dam skirt; an inverse lifting plate fitted on side walls of said front inlet and having a lower front side and a higher rear side; and a bottom inverse lifting plate disposed behind the first-named inverse lifting plate and similar to the same.

8. A suspended type air-dam skirt according to claim 1, further comprising shock absorbing members mounted on one of said car body and said air-dam skirt; wherein said guide members, said regulating members, and said resilient means have root end portions mounted movably to one of said car body and said air-dam skirt.

9. A syspended type air-dam skirt according to claim 1, wherein said resilient means includes at least one of metal cylinders and rubber bellows suspending said air-dam skirt and having a gas content thereof adjusted by an actuatable pump.

10. A suspended type air-dam skirt according to claim 1, wherein said guide members, said regulating members, and said resilient means are made of replaceable members which are breakable under a force slightly weaker than an impact force which is capable of breaking said air-dam skirt.

11. A suspended type air-dam skirt according to claim 1, wherein said resilient means includes at least one of metal cylinders and rubber bellows suspending said air-dam skirt and having a liquid content thereof adjusted by an actuatable pump.

12. A suspended type air-dam skirt according to claim 1, wherein said regulating members project downward from said car body, and wherein said guide members are mounted on said air-dam skirt to support said regulating members.

* * * * *